United States Patent [19]

Hagiwara et al.

[11] Patent Number: 4,593,814
[45] Date of Patent: Jun. 10, 1986

[54] MAGNETIC TAPE CASSETTE STORING CASE

[75] Inventors: Hideo Hagiwara, Aichi; Hiroshi Matsumoto, Kanagawa, both of Japan

[73] Assignee: Fuji Photo Film Co., Ltd., Kanagawa, Japan

[21] Appl. No.: 694,735

[22] Filed: Jan. 25, 1985

[30] Foreign Application Priority Data

Jan. 25, 1984 [JP] Japan ................. 59-9445[U]

[51] Int. Cl.⁴ ........................................... B65D 85/07
[52] U.S. Cl. .................................. 206/387; 206/493
[58] Field of Search ............ 206/387, 493, 455, 446

[56] References Cited

U.S. PATENT DOCUMENTS

| | | | |
|---|---|---|---|
| 4,291,801 | 9/1981 | Basili et al. | 206/387 |
| 4,304,331 | 12/1981 | Minkow | 206/387 |
| 4,428,482 | 1/1984 | Ogawa | 206/387 |
| 4,496,048 | 1/1985 | Sykes | 206/387 |

*Primary Examiner*—Joseph Man-Fu Moy
*Attorney, Agent, or Firm*—Sughrue, Mion, Zinn, Macpeak and Seas

[57] ABSTRACT

A magnetic tape cassette storage case of a type suitable for storing operational-type video tape cassettes in which the reels can freely rotate when unloaded from a video tape recorder. The storage case is composed of a box-shaped body receiving the tape cassette and a cover for a opening and closing the box-shaped body, wherein the body is provided with engaging parts on an inner surface of the bottom thereof shaped so as to engage with corresponding reel hub holes of the magnetic tape cassette. Each of the engaging parts includes a rotation preventing structure in the form of a discontinuous ring composed of a plurality of protrusions extending from the inner surface of the bottom of the case body inwardly of the case, and a positioning structure arranged inside the rotation preventing structure composed of at least one protrusion extending from the inner surface of the bottom the case body inwardly of the case.

4 Claims, 4 Drawing Figures

MAGNETIC TAPE CASSETTE STORING CASE

BACKGROUND OF THE INVENTION

The present invention relates to cases for storing magnetic tape cassettes, and more particularly, to a cassette storage case for storing a so-called "operational" video tape cassette.

An operational video tape cassette, unlike the more common type of video tape cassette, is designed so that the reels can freely rotate when it is unloaded from the video tape recorder. Therefore, in order to prevent the magnetic tape in the video tape cassette from damage which may be caused by slackening or pulling of the magnetic tape during transport or storage of the video tape cassette, the cassette storage case should have a reel rotation preventing mechanism. Conventional cassette storage cases with such reel rotation preventing mechanisms can be divided into a first group of cassette storage cases manufactured by vacuum molding and a second group of cassette storage cases manufactured by injection molding.

These conventional cassette storage cases suffer form the following difficulties: In the cassette storage case manufactured according to the vacuum molding method, a reel rotation preventing part and the case body are vacuum molded as one unit with one and the same plastic material. In the vacuum molding method, the rotation preventing part, which engages with the reel hubs, can be made elastic by reducing its thickness. As a result, it is possible for the rotation preventing part to positively engage with the reel hubs, i.e., to positively prevent the rotation of the reel hubs. With the rotation preventing part engaged with the reel hubs, the latter cannot be deformed, even if the magnetic tape cassette is held in the cassette storage case for a long period of time. The molding apparatus is relatively low in price. In these points, employment of the vacuum molding method for manufacturing the cassette storing case is preferable. However, it is still disadvantageous in that the molding operation takes a relatively long time and accordingly the molding cost is high.

On the other hand, cassette storage cases manufactured according to the injection molding method can be classified into a first group in which the case body formed by injection molding is combined with a rotation preventing member composed of separate components such as engaging pins, and a second group in which the rotation preventing device consists of long, rigid projections formed simultaneously when the case body is formed by injection molding. The former is advantageous in that the rotation of the reel hubs can be positively prevented. However, it is disadvantageous in that, since it requires a number of separate components, a excessive number of assembly steps are required and accordingly it is high in manufacturing cost. The latter suffers from the difficulties that, when the magnetic tape cassette is stored for a long period of time, the reel hubs may be deformed, and the rotation of the reel hubs cannot be effectively prevented.

SUMMARY OF THE INVENTION

In view of the foregoing, an object of the invention is to provide a magnetic tape cassette storage case with which rotation of the reel hubs in the magnetic tape cassette is effectively prevented, the reel hubs will not be deformed, and which can be readily manufactured.

Attaining the above and other objects, the invention provides a magnetic tape cassette storing case comprising: a box-shaped body for receiving a magnetic tape cassette; and a cover for opening and closing the box-shaped body, in which, according to the invention, the body has engaging parts on the inner surface of the bottom thereof which are adapted to engage with the reel hub holes of the magnetic tape cassette, each of the engaging parts including rotation preventing means in the form of a discontinuous ring having a plurality of protrusions extending from the inner surface of the bottom of the body inwardly of the case; and positioning means arranged inside the rotation preventing means which has at least one protrusion extending from the inner surface of the bottom of the body inwardly of the case.

DESCRIPTION OF THE PREFERRED EMBODIMENTS

Figure 1:
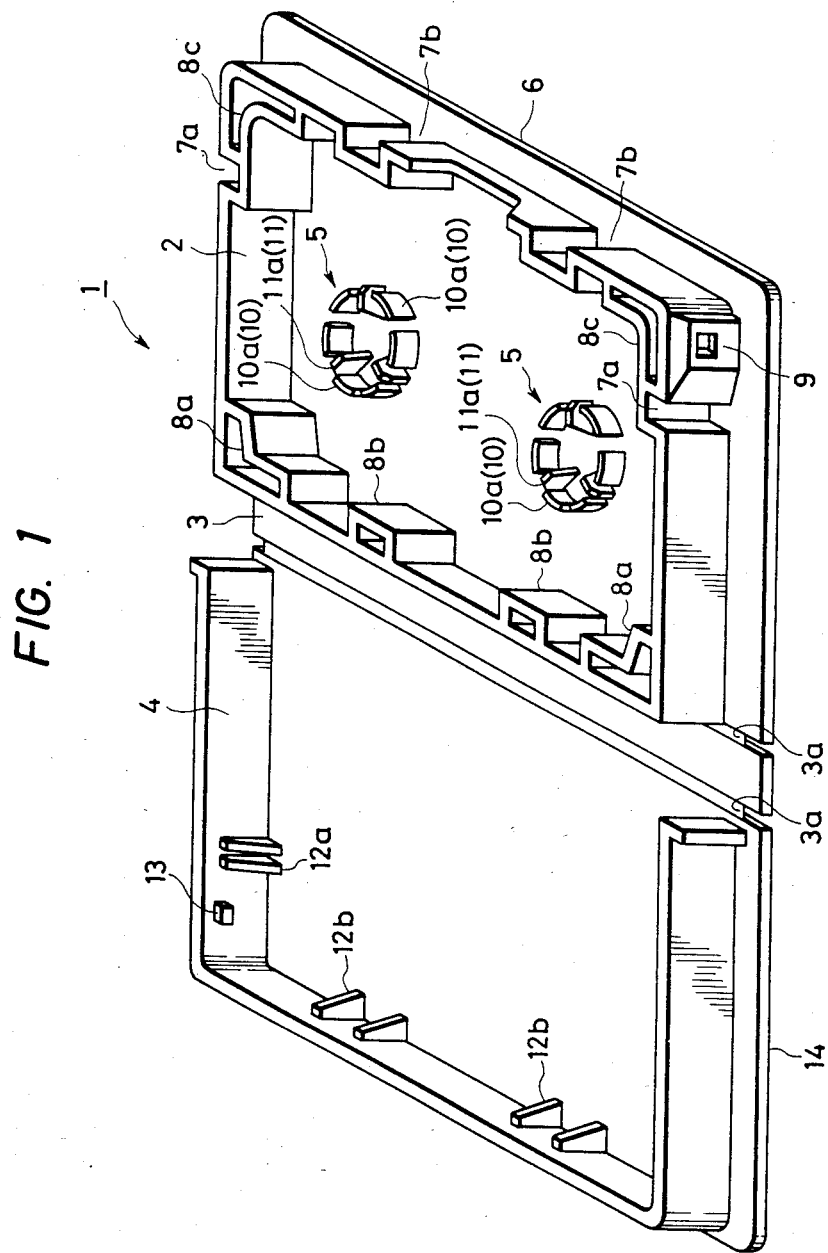
FIG. 1 is a perspective view of a cassette storage case according to the invention.
Figure 2:
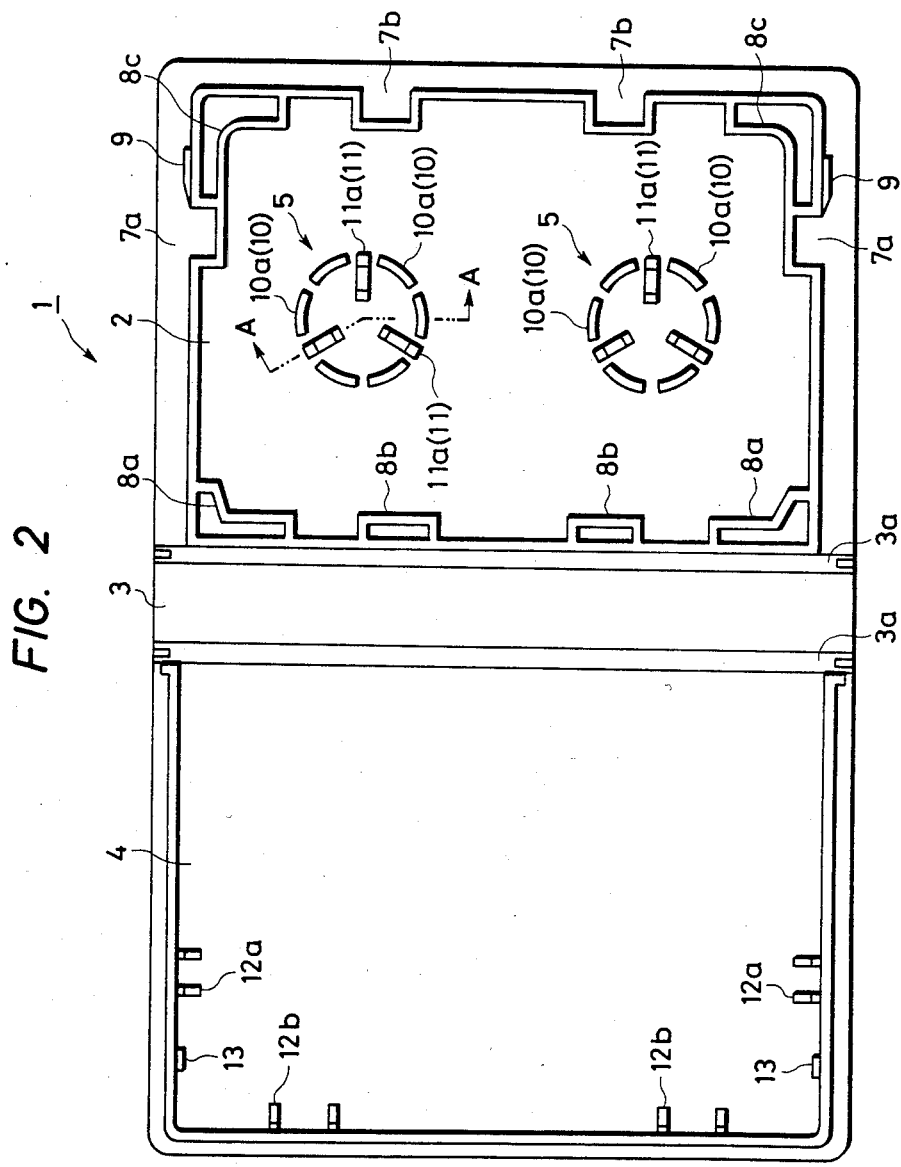
FIG. 2 is a plan view of a cassette storage case.
Figure 3:
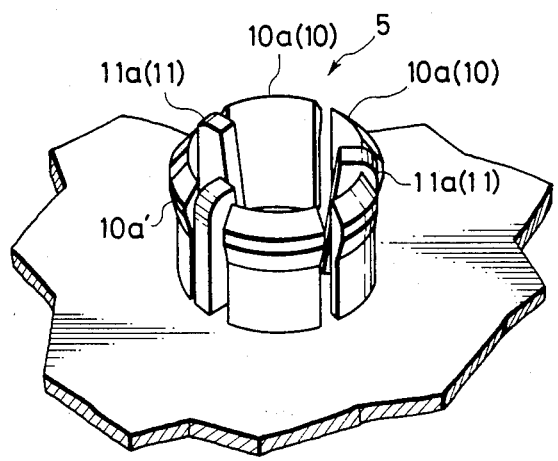
FIG. 3 is an enlarged perspective view of an engaging part of the case.
Figure 4:
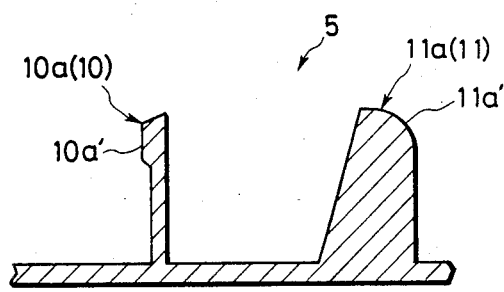
FIG. 4 is a sectional view taken along a line A—A in FIG. 2.

The accompanying drawings show a preferred embodiment of a cassette storage case of the invention. More specifically, FIG. 1 is a perspective view of a cassette storage case, FIG. 3 is an enlarged perspective view of an engaging part of the case, and FIG. 4 is a sectional view taken along a line A—A in FIG. 2.

The cassette storage case 1 according to the invention includes a body 2 for receiving a magnetic tape cassette, a cover 4 connected through a connecting plate 3 to the body 2 and adapted to freely open and close the opening of the body 1, and engaging parts 5 formed on the inner surface of the bottom and adapted to engage with the reel hub holes of a magnetic tape cassette.

The body 2 is in the form of a box which is open upwardly and which has a bottom and four side walls. The peripheral portion of the bottom is formed into a flange to facilitate the opening and closing operation of the cassette storage case 1. The side walls of the body include reinforcing recesses 7a and 7b, reinforcing ribs 8a, 8b and 8c which are shaped and arranged in conformance to the contour of the magnetic tape cassette, and engaging holes 9. The engaging parts 5 adapted to engage with the reel hub holes of a magnetic tape cassette are formed on the inner surface of the bottom of the body 2. Each engaging part 5 has a rotation preventing structure 10 in the form of a discontinuous ring including a plurality of protrusions 10a which extend from the inner surface of the bottom of the body 2 inwardly of the case, and a positioning structure 11 arranged inside the rotation preventing structure 10 and having protrusions 11a which also extend from the inner surface of the bottom inwardly of the case. Each of the protrusions 10a forming the rotation preventing structure 10 is made up of a top portion 10a' whose outer surface is curved outwardly and a base portion whose thickness is smaller than that of the top portion 10a' and is thus elastic. The top portions 10a' of the protrusions 10a are brought into close contact with the wall of the reel hub hole of the cassette by their elastic forces, thus providing a force of friction there to prevent the rotation of the reel.

With the rotation preventing mechanism as described above, if the thickness of each protrusion 10 is reduced to decrease the rigidity and the area of each top portion 10a' which is brought into contact with the wall of the reel hub hole is increased, the force acting to deform the reel hub can be decreased, that is, the possibility of deformation of the reel hub is reduced. However, if the thickness of the protrusions 10a is decreased and the protrusions 10a are elongated circumferentially, then the rotation preventing effect is reduced. Therefore, the thickness of the protrusions 10a and the amount of elongation of the protrusions 10a circumferentially should be determined according to the materials of the magnetic tape cassette and the cassette storage case, taking the deformation of the reel hubs and the rotation preventing effect into consideration.

The positioning structure 11 provided inside the rotation preventing structure 10 may have a single or a plurality of protrusions 11a. In engaging parts 5 of the case, the positioning structure 11 operates to guide the reel hubs to their correct positions so that the reel hubs are positively engaged with the engaging parts 5. It is preferable that, as shown in FIG. 2, three protrusions 11a be arranged radially at equal angular intervals. The three protrusions 11a may be in contact with one another at the center, or they may be formed as one unit. Furthermore, it is desirable that the top portion 11a' of each protrusion 11a be rounded as shown in FIG. 4 so that the reel hub is readily guided to its correct position.

The body 2 thus constructed is connected through the connecting plate 3 to the cover 4. More specifically, thin-plate-shaped hinges 3a are respectively provided between the connecting plate 3 and the body 2 and between the connecting plate 3 and the cover 4 so that the cover 4 can readily open and close the body 2.

The cover 4 connected through the connecting plate 3 to the body 2 and adapted to cover the latter is in the form of a box with three side walls which are engaged with the side walls of the body 2. The side walls of the cover 4 includes reinforcing fitting protrusions 12a and 12b which are fitted into the reinforcing recesses 7a and 7b, respectively, formed in the body 2, and engaging protrusions 13 which are engaged with the engaging holes 9 formed in the body 2. The bottom of the box-shaped cover 4, which forms the top when the body is closed by the cover 4, has a flange 14. When the body is covered by the cover 4, the reinforcing recesses 7a and 7b and the reinforcing fitting protrusions 12a and 12b are engaged with one another and strengthen the cassette storing case 1. The engaging protrusions 13 are designed so that they engage with the engaging holes 9 of the body 2 when the cover 4 is correctly engaged with the body 2 and the cover 4 cannot be opened without using a force which is larger than a predetermined value.

In the cassette storage case thus constructed, the top portion of each of the protrusions 10a forming the rotation preventing structure is curved outwardly, thus being larger in thickness than the remaining portion. That is, the protrusion 10a has an undercut at the top portion. However, if a two-stage ejection-type metal mold is employed, then the protrusions 10a can be readily removed from the mold. Therefore, the body, the cover and the connecting plate can be molded as one unit simultaneously using an injection molding method which has extensively been employed for molding plastics.

As is apparent from the above description, in the cassette storage case of the invention, rotation of the reels in a magnetic tape cassette is prevented by utilizing the force of friction which is obtained when the walls of the reel hubs are brought into close contact with the outside of the rotation preventing structure, which is in the form of a discontinuous ring. Since the rotation preventing structure brought into close contact with the walls of the reel hubs is annularly shaped, the close contact area is large, and accordingly the force of friction provided there is large, which remarkably improves the reel rotation preventing effect.

As described above, each rotation preventing structure is annular, its area brought into close contact with the wall of the reel hub is large, and the base portion of each of the protrusions forming the rotation preventing structure is smaller in thickness than the top portion. As a result, the reel hub deforming force is greatly reduced, and therefore the reel hub is deformed very little. Each of the protrusions forming the rotation preventing means is arcuate. Therefore, even if the thickness of the protrusions is small, the protrusions still have a high mechanical strength. Furthermore, the reduction of the thickness of the protrusions prevents the outer surface of the body where the protrusions are formed from bending. In addition, the cassette storage case according to the invention has a positioning structure for guiding the reel hubs to their correct positions so that the reel hubs are always correctly engaged with the rotation preventing structure.

As described above, the cassette storage case according to the invention, which is considerably effective in preventing the rotation of the reel hubs in a magnetic tape cassette and in preventing the deformation of the reel hubs, is suitable in configuration for injection molding so that the body, the connecting plate and the cover can be molded as one unit simultaneously. Furthermore, since no separate components are used to form the cassette storage case, the latter can be manufactured readily in a short molding cycle and at a low manufacturing cost.

We claim:

1. A magnetic tape cassette storage case comprising a box-shaped body for receiving a magnetic tape cassette and a cover for opening and closing said box-shaped body, wherein the improvement comprises:
   said body has engaging parts on an inner surface of a bottom thereof which are shaped to engage with corresponding reel hub holes of said magnetic tape cassette, and wherein each of said engaging parts comprises:
   rotation preventing means in the form of a discontinuous ring comprising a plurality of protrusions extending from said inner surface of said bottom of said body inwardly of said case; and
   positioning means arranged inside said rotation preventing means comprising at least one protrusion extending from said inner surface of said bottom of said body inwardly of said case.

2. The magnetic tape cassette storage case as claimed in claim 1, in which each of said protrusions forming said rotation preventing means has a top portion which is curved outwardly of greater thickness than remaining portions thereof.

3. The magnetic tape cassette storage case as claimed in claim 1, wherein said storage case is formed by injection molding.

4. The magnetic tape cassette storage case as claimed in claim 1, wherein each of said protrusions extends substantially perpendicular to the respective discontinuous ring.

* * * * *